United States Patent [19]

Skaria et al.

[11] Patent Number: 4,693,878
[45] Date of Patent: Sep. 15, 1987

[54] PROCESS FOR THE PRODUCTION OF SOLUBLE ALKALI SILICATES

[75] Inventors: Arankathu Skaria, Stäfa; Heinrich Goeldi, Neuhausen, both of Switzerland

[73] Assignee: Swiss Aluminium Ltd., Chippis, Switzerland

[21] Appl. No.: 919,017

[22] Filed: Oct. 15, 1986

[30] Foreign Application Priority Data

Jun. 11, 1986 [CH] Switzerland ................ 2365/86

[51] Int. Cl.$^4$ .............................................. C01B 33/32
[52] U.S. Cl. ..................................... 423/334; 423/332
[58] Field of Search ........... 423/334, 326, 328, 328 C, 423/332

[56] References Cited

U.S. PATENT DOCUMENTS 1,493,708  5/1924  Schneider ............................ 423/332
3,870,532  3/1975  Biegler et al. ....................... 423/332
4,597,956  7/1986  Hinchey et al. ................. 423/328 C

FOREIGN PATENT DOCUMENTS 0094288  11/1983  European Pat. Off. ........ 423/328 C

*Primary Examiner*—Patrick P. Garvin
*Assistant Examiner*—Paige C. Harvey
*Attorney, Agent, or Firm*—Bachman & LaPointe

[57]  ABSTRACT

A need exists for an economical process for the production of alkali silicates of high purity, especially soda-waterglass, from waste silicic acid. From a waste silicic acid occurring in the reaction of hexafluorosilicic acid with aluminum hydroxide, which is treated with hot 15–25% wt. hexafluorosilicic acid and then calcined preferably at 750°–900° C. in a flow of water vapor, alkali silicates can be obtained with low degree of impurity, which are suitable advantageously for the production of precipitated silicic acid.

14 Claims, No Drawings

PROCESS FOR THE PRODUCTION OF SOLUBLE ALKALI SILICATES

The present invention relates to a process for the production of soluble alkali silicates, especially soda-waterglass, by removal of the fluorine from a finely divided waste silicic acid containing free water and having a BET-surface of <20 m²/g, with a fluorine content of <10% in the dry substance, reacted with an alkali-containing compound and if desired filtration of the aqueous suspension.

Such a process is known from DE-OS 22 19 503. In the process, as alkali-containing compound, alkali hydroxide in above-stoichiometric quantity as concentrated solution is reacted with the silicic acid at boiling temperature over three hours and then the suspension is filtered hot. For the removal of the fluorine it is proposed to mix the alkali hydroxide solution with 1 to 15% wt. of calcium hydroxide, related to the initial material, and after a reaction time of sixty minutes to effect a fluoride precipitation.

The proposed process of DE-OS 22 19 503 is not suitable for the production of soluble alkali silicates of high purity, especially soda-waterglass of high purity, if a waste silicic acid from the aluminum fluoride production process according to the following equation is used $$H_2SiF_6 + 2Al(OH)_3 \rightarrow 2AlF_3 + SiO_2 + 4H_2O$$

since such a waste silicic acid contains large quantities of aluminum as well as fluorine. The aluminum is present as aluminum fluoride, which was entrained during the precipitation, and as unreacted aluminum hydroxide $Al(OH)_3$. The fluorine is partly bound to aluminum fluoride, but partly also bound directly to the silicon, as appears from Flemmert, G. L., not Hydrogen Fluoride and Pyrogenic Silica from Fluosilicic Acid, The Fertiliser Society, Proceedings No. 163 (1977):

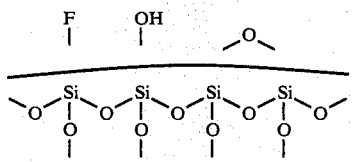

The remainder of aluminum fluoride solution remaining after the filtration in the silicic acid cake can easily be washed out with a small quantity of water. Admittedly 2-3% aluminum (as Al related to $SiO_2$ dry) still remains behind. This aluminum residue consists of the unreacted aluminum hydroxide and already crystallized-out aluminum fluoride trihydrate, $AlF_3 \cdot 3H_2O$.

The preceding purification of the waste silicic acid, especially as regards aluminum, is of decisive importance for a satisfactory alkali silicate, especially soda-waterglass. If in fact the silicic acid still contains 0.1% wt. or more of aluminum (Al or ≧0.2% wt. $Al_2O_3$), the yield of alkali silicate, especially soda-waterglass, deteriorates. Moreover the waterglass is unstable, especially when it is diluted with water. Then a clouding or even complete gelling occurs.

Therefore the present invention is based upon the problem of producing a stable alkali silicate, especially soda-waterglass, of high purity which does not possess the foregoing disadvantages. A further problem consists in producing these alkali silicates under economically favorable conditions.

The solution to the foregoing problem is reached in accordance with the present invention in that the waste silicic acid occurring by reaction of hexafluorosilicic acid with aluminum hydroxide is treated with agitation with hexafluorosilicic acid heated to 60°-100° C., filtered, freed with a little water from the remaining acid, calcined in the range of 700° C., preferably 750° C., and 1300° C., preferably 900° C., reacted with the alkali-containing compound and if necessary the suspension is filtered.

It is advantageous if one uses a waste silicic acid occurring by reaction of 15-25% wt. hexafluorosilicic acid with solid aluminum hydroxide. The waste silicic acid is added with agitation, in a quantity which is stoichiometric to a maximum of 5% by weight. The temperature, which rises during the reaction to between 97° C. and the boiling point, is maintained up to 15 minutes. The hexafluorosilicic acid is preferably at a temperature of 80°-95° C. before the reaction.

Further advantageous forms of embodiment of the process according to the invention appear herein.

The advantage of the process according to the invention consists in that aluminum is practically completely dissolved out of the silicic acid by the hexafluorosilicic acid. In addition fluorine bound to the silicon, which can amount to up to 7% (related to $SiO_2$ dry) is almost completely expelled by the calcination.

The preferred waste silicic acid has the special advantage that it possesses a fine primary grain which however can still be filtered well in the aluminum fluoride production process. In addition, the waste silicic acid can be washed out easily by hexafluorosilicic acid. In the case of the preferred waste silicic acid the dissolution and removal of the aluminum takes place both quickly and completely.

As is known aluminum can be brought into solution by reaction with an acid. By an excess of hexafluorosilicic acid, unreacted aluminum hydroxide and the already crystallized-out aluminum fluoride hydroxide are also dissolved. In order to arrive at the requisite minimum aluminum content however the above-stated special measures for this purification step are indispensible.

The silicic acid occurring according to the preferred form of embodiment is amorphous and consists of agglomerates of primary particles of about 0.5-1 μm. The primary particle size is not impaired either by the acid treatment or by the subsequent calcining, and leads to short reaction times by reason of the small grain size and the large surface area in the subsequent reaction with the alkali-containing compound compared with the previously known processes, which consequently contributes to increased economy of the process according to the invention.

Experiments, showed that a higher aluminum content than allowed in the process according to the invention causes a residue of silicic acid up to 50% (related to $SiO_2$) when one dissolves silicic acid in sodium hydroxide. In addition this leads to a jelly like mass when dissolving the sintered product in the case of soda being used for the production of water glass, in accordance with Vail, J. G., Soluble Silicates, Vol. 1, 1952 pp. 18. On the other hand according to the process in accordance with the invention the residue amounted to only between 5 and 15% in relation to the introduced $SiO_2$. The waterglasses with different $SiO_2/Na_2O$ molar ratios produced in accordance with the present invention, were clear and remained clear and did not gel even in dilute form, even those with ratios above 4.

In the purification of the waste silicic acid from fluorine it is especially important that the waste silicic acid is previously freed of aluminum, since otherwise the entrained aluminum fluoride is converted into aluminum oxide by the calcination process, especially in the presence of water vapor. This not only makes the production of alkali silicate more difficult but also reduces the yield thereof.

Fluorine containing soda-waterglass remains stable over a lengthy time even when dilute and thus the fluorine removal contributes only inappreciably to the increase of stability of the waterglass. However, an increased fluorine content, apart from the health-harming effect, in certain applications of the waterglass has the disadvantage that such a waterglass possesses higher viscosity and only about 30% solutions can be produced. On the other hand according to the process in accordance with the present invention, in laboratory experiments waterglasses with solid contents up to about 37% could be produced.

A waterglass of high purity can be produced in an economically advantageous manner by the combination of the purification steps of the process according to the present invention. A silicic acid precipitated therefrom contains only <60 to 150 ppm. of fluorine, according to whether the fluorine was removed with or without the supply of water vapor.

EXAMPLE 1

504 g of aluminum hydroxide (99% Al(OH)$_3$) are added in measured manner within 20 seconds to 2 l of 19.9% hexafluorosilicic acid preheated to 90° C. The mixture heated after 1 minute to boiling temperature. After 14 minutes of reaction the suspension is filtered on a suction filter at an end-pH-value of 2.4 and washed with 2 l of mother liquor from the aluminum fluoride trihydrate crystallization per kg of dry SiO$_2$.

The analysis produced the following values:
3% aluminum
4.5% fluorine (in relation to the dried silicic acid).

The filter cake was then suspended in 2 l of hexafluorosilicic acid preheated to 90° C. and stirred for 15 minutes at 90°-95° C. Then filtration was effected again and washing was effected with 2 l of water per kg of dry SiO$_2$ in counter-current.

The silicic acid was dried and calcined in the rotary cylindrical furnace with an input temperature of 600° and a maximum temperature of 900° C., with water vapour supply in counter-current. The calcining time amounted to 60 minutes, of which about 20 minutes were devoted to the maximum temperature. After the purification steps the analysis showed the following values:
0.025% aluminum
0.011% fluorine (in relation to the dried silicic acid).

EXAMPLE 2

For the production of a waterglass, 100 g of the purified silicic acid was mixed with 250 g of 15% sodium hydroxide solution, so that the SiO$_2$ was present with 35% excess. After 35 minutes reaction at boiling temperature a molar ratio SiO$_2$/Na$_2$O of 3.0 was obtained. After further 25 minutes filtration was effected with a pressure/suction filter. Analysis produced the following values:
Na$_2$O: 8.7%
SiO$_2$: 27.8%
Molar ratio SiO$_2$/Na$_2$O: 3.3%
Solid content: 36.5%

EXAMPLE 3

For the production of a waterglass 22 g of the purified silicic acid were mixed with 8.5 g of anhydrous sodium carbonate and sintered for 30 minutes in the Muffle furnace at 810° C. 60 ml of water were added to the easily pulverizable sintered product and the mixture was kept in the autoclave at 150° C. and 4 bars for 30 minutes for dissolution.

The residue in a quantity of 10.5% (related to the utilized SiO$_2$) was filtered. The waterglass was clear and had the following composition:
Na$_2$O: 5.7%
SiO$_2$: 22.8%
Molar ratio SiO$_2$/Na$_2$O: 4.1%
Solid content: 28.5%

When the waterglasses produced in examples 2 and 3 were diluted they remained clear and did not gel.

EXAMPLE 4

A precipitated silica, produced according to the method of Iler, R. K., The Chemistry of Silica, 1979, pp. 558, utilizing a waste silicic acid according to the preferred process of the present invention, showed following characteristics: primary particle size of 10-20 nm, surface area (BET) about 195 m$^2$/g, fluorine content <60 ppm. The fluorine content in the silicic acid utilized was 120 ppm. Such a purity was obtained by carrying out the fluorine purification step in pure water vapor atmosphere and at a temperature in the range of 750° C. to 900° C. Without the supply of water vapor such a fluorine purity could be achieved only by calcining at temperatures in the range of 1100°-1300° C. When the fluorine purification step was carried out at a temperature range of 750° C. to 900° C. without the supply of water vapor, it was possible to reduce the fluorine content only to 1,8%. The experiments were carried out in a laboratory rotary calciner. Thus special importance must be attributed to the supply of water vapor during the fluorine removal. The reason is to be seen in that the fluorine bound to silicon is practically completely hydrolyzed by the water vapor.

We claim:
1. Process for the production of soluble alkali silicates by removal of the fluorine from a finely divided waste silicic acid reacted with an alkali-containing compound, said silicic acid containing free water and having a BET-surface of less than 20 m$^2$/g, with a fluorine content of less than 10% in the dry substance, which process comprises:
providing said waste silicic acid occurring by reaction of hexafluorosilicic acid with aluminum hydroxide;
treating said waste silicic acid with agitation with hexafluorosilicic acid heated to 60°-100° C. to form a mixture;
filtering the mixture;
washing the filter cake with water to free the filter cake from remaining hexafluorosilicic acid;
calcined in the range of 600°-1300° C.; and,
reacting with an alkali-containing compound.
2. Process according to claim 1 wherein a waste silicic acid, obtained by reaction of 15-25% wt. hexafluorosilicic acid heated to 80°-95° C. with solid aluminum hydroxide, is added to hexafluorosilicic with agita- tion in a quantity which is stoichiometric to a maximum of 5% wt., while maintaining the temperature for up to 15 minutes, wherein said temperature rises during the reaction to between 97° C. and the boiling point.

3. Process according to claim 1 wherein the treatment with hexafluorosilicic acid is carried out during 10 to 30 minutes.

4. Process according to claim 1 including the step of reacting aluminum hydroxide and hexafluorosilicic wherein the aluminum hydroxide is added to the hexafluorosilicic acid within 20 seconds.

5. Process according to claim 1 wherein the calcining is carried out with supply of water vapor.

6. Process according to claim 5 wherein the calcining is carried out in pure water vapor atmosphere.

7. Process according to claim 1 wherein the purified silicic acid in an above-stoichiometric quantity of 20-25% wt. is brought to reaction at a temperature of 90°-100° C. during 45-60 minutes with a 10-20% wt. alkali hydroxide solution and the hot suspension is filtered off.

8. Process according to claim 1 wherein the purified silicic acid is mixed with the stoichiometric quantity of anhydrous soda, the mixture is sintered at 700°-850° C. for 20-60 minutes and the sintered product is treated with water in an autoclave during a maximum of 50 minutes and the hot suspension is filtered.

9. Process according to claim 7 wherein the excess silicic acid from the filtration of the suspension is added to a following batch for the production of alkali silicate.

10. Process according to claim 8 wherein the excess silicic acid from the filtration of the suspension is added to a following batch for the production of alkali silicate.

11. Process according to claim 1 for the production of soda-waterglass.

12. Process according to claim 1 wherein reaction with the alkali-containing compound forms a suspension, and including the step of filtering the suspension.

13. Process according to claim 7 wherein soda-waterglass is produced and wherein the purified silicic acid has a primary particle size of 10-20 nm and a BET surface of about 195 $m^2/g$.

14. Process according to claim 8 wherein soda-waterglass is produced and wherein the purified silicic acid has a primary particle size of 10-20 nm and a BET surface of about 195 $m^2/g$.

* * * * *